United States Patent
Shen et al.

(10) Patent No.: US 10,847,789 B2
(45) Date of Patent: Nov. 24, 2020

(54) NEGATIVE ELECTRODE MATERIAL FOR SECONDARY BATTERY, METHOD FOR PREPARING THE SAME, AND BATTERY CONTAINING THE SAME

(71) Applicant: CONTEMPORARY AMPEREX TECHNOLOGY CO., LIMITED, Ningde (CN)

(72) Inventors: Rui Shen, Ningde (CN); Libing He, Ningde (CN); Shuli Li, Ningde (CN); Jianjun Ma, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 145 days.

(21) Appl. No.: 15/662,139

(22) Filed: Jul. 27, 2017

(65) Prior Publication Data

US 2018/0062167 A1    Mar. 1, 2018

(30) Foreign Application Priority Data

Aug. 26, 2016    (CN) .......................... 2016 1 0729568

(51) Int. Cl.

| | |
|---|---|
| H01M 4/36 | (2006.01) |
| C01B 33/18 | (2006.01) |
| H01M 4/48 | (2010.01) |
| C01B 32/05 | (2017.01) |
| H01M 4/587 | (2010.01) |
| H01M 4/62 | (2006.01) |
| H01M 10/0525 | (2010.01) |
| H01M 4/02 | (2006.01) |

(52) U.S. Cl.
CPC ............ *H01M 4/366* (2013.01); *C01B 32/05* (2017.08); *C01B 33/18* (2013.01); *H01M 4/48* (2013.01); *H01M 4/483* (2013.01); *H01M 4/587* (2013.01); *H01M 4/625* (2013.01); *C01P 2004/61* (2013.01); *H01M 10/0525* (2013.01); *H01M 2004/021* (2013.01); *H01M 2004/027* (2013.01)

(58) Field of Classification Search
CPC ........ H01M 4/364; H01M 4/366; H01M 4/48; H01M 4/483; H01M 4/583; H01M 4/587; H01M 4/622; H01M 10/0525; H01M 2004/021; H01M 2004/027; H01M 4/625; C01B 32/05; C01B 33/18; C01P 2004/61
See application file for complete search history.

(56) References Cited

U.S. PATENT DOCUMENTS

| | | | | |
|---|---|---|---|---|
| 9,515,298 | B2 * | 12/2016 | Saruwatari | .......... H01M 2/0202 |
| 2004/0035326 | A1 * | 2/2004 | Borzyk | ................. C09B 67/006 |
| | | | | 106/499 |
| 2004/0247872 | A1 * | 12/2004 | Sudo | ................. C04B 35/62802 |
| | | | | 428/402.24 |
| 2007/0020522 | A1 * | 1/2007 | Obrovac | ............... H01M 4/134 |
| | | | | 429/218.1 |
| 2007/0215381 | A1 * | 9/2007 | Vasoya | ................ H05K 3/4641 |
| | | | | 174/262 |
| 2008/0214014 | A1 * | 9/2008 | Ranish | .................. H01L 21/268 |
| | | | | 438/758 |
| 2011/0052965 | A1 * | 3/2011 | Kim | ..................... H01M 2/0247 |
| | | | | 429/156 |
| 2012/0301790 | A1 * | 11/2012 | Xiao | ................... H01M 4/0404 |
| | | | | 429/241 |
| 2013/0155577 | A1 * | 6/2013 | Yang | ..................... H01M 4/133 |
| | | | | 361/502 |
| 2013/0337325 | A1 * | 12/2013 | Jung | ................ H01M 10/0525 |
| | | | | 429/218.1 |
| 2017/0170465 | A1 * | 6/2017 | Kim | ..................... H01M 4/1393 |

FOREIGN PATENT DOCUMENTS

| | | |
|---|---|---|
| CN | 1549362 A | 11/2004 |
| CN | 102255077 A | 11/2011 |
| CN | 102903896 A | 1/2013 |
| WO | WO 2016/032240 | * 2/2016 |

OTHER PUBLICATIONS

Machine translation of CN 1549362 A, published on Nov. 11, 2004 (Year: 2004).*
Denka Black, Denka Corporation, 2016 (Year: 2016).*
Gnanamuthu, RM, Lee, C.W.—Electrochemical properties of Super P carbon black as an anode active material for lithium-ion batteries, Materials Chemistry and Physics 130 (2011), pp. 831-834 (Year: 2011).*
Kwiecinska, B.K., Pusz, S.—Pyrolytic carbon-Definition, classification and occurence, International Journal of Coal Geology 163 (2016) pp. 1-7 (Year: 2016).*
Carbonization-definition by the Free Dictionary, date unknown.*
State Intellectual Property Office of the People's Republic of China, Office Action and Search Report Issued in Application No. 201610729568.6, dated Mar. 5, 2018, 18 pages. (Submitted with Machine Translation).
State Intellectual Property Office of the People's Republic of China, Office Action and Search Report Issued in Application No. 201610729568.6, dated Jan. 2, 2019, 20 pages. (Submitted with Partial Translation).

* cited by examiner

*Primary Examiner* — Anca Eoff
(74) *Attorney, Agent, or Firm* — McCoy Russell LLP

(57) ABSTRACT

The present application relates to the field of secondary batteries and, particularly, relates to a negative electrode material for the secondary battery, a method for preparing the same, and a secondary battery containing the same. The negative electrode material includes a kernel particle, a connection carbon layer, a conductive carbon microparticle, the connection carbon layer is coated on a surface of the kernel particle, and the conductive carbon microparticle is distributed on a surface of the connection carbon layer. A high-molecular polymer is used as binder. A layer of conductive carbon microparticle is uniformly coated on a surface of the negative electrode active material, so that a stable and effective conductive network is formed in the electrode plate, thereby significantly improving a dynamic performance of the negative electrode material and providing a battery containing the negative electrode material with high rate performance and fast charging capability.

15 Claims, 2 Drawing Sheets

NEGATIVE ELECTRODE MATERIAL FOR SECONDARY BATTERY, METHOD FOR PREPARING THE SAME, AND BATTERY CONTAINING THE SAME

CROSS-REFERENCE TO RELATED APPLICATIONS

The present application claims the benefit of priority to Chinese Patent Application No. 201610729568.6, filed on Aug. 26, 2016, the content of which is incorporated herein by reference in its entirety for all purposes.

TECHNICAL FIELD

The present application relates to the field of secondary batteries and, specifically, relates to a negative electrode material for a secondary battery, a method for preparing the negative electrode material, and a secondary battery containing the negative electrode material.

BACKGROUND

Currently, about a negative electrode material for a secondary battery, in a process for preparing the electrode plate, a conductive carbon, such as SuperP, is required to be added, dry-mixed and dispersed to form a conductive network in a negative electrode plate, thereby improving dynamic performance of the negative electrode. However, since the conductive carbon has small a particle size, it takes a long time to dry-mix the conductive carbon for uniformly dispersing, and thus the conductive carbon cannot fully function. In usage of the secondary battery, as the cycling times increase, it is difficult to keep the conductive carbon contacting well with the active material, because of the failure of the adhesive additive and the particle re-arrangement, which may worsen the dynamic performance of the bare cell after a long-term cycling. In addition, if the dynamic performance of the negative electrode cannot meet the needs, Li ion may be reduced into Li metal on a surface of the negative electrode, which may cause a decay of the battery capacity and a severe safety problem.

For solving the above-mentioned problems, the present application is proposed.

SUMMARY

A first purpose of the present application is to provide a negative electrode material for a secondary battery.

A second purpose of the present application is to provide a method for preparing the negative electrode material for the secondary battery as above-mentioned.

A third purpose of the present application is to provide a secondary battery including the negative electrode material as above-mentioned.

To achieve the purposes of the present application, technical solutions are used as follows:

The present application relates to a negative electrode material for a secondary battery. The negative electrode material includes a kernel particle, a connection carbon layer, a conductive carbon microparticle, wherein the connection carbon layer is coated on a surface of the kernel particle, and the conductive carbon microparticle is distributed on a surface of the connection carbon layer.

Preferably, a median particle size of the negative electrode material is in a range of substantially from 1.5 μm to 60.0 μm.

Preferably, the kernel particle is made of a carbon-containing material or a silicon-containing material, preferably, the carbon-containing material is selected from a group consisting of graphite, soft carbon, hard carbon and mesocarbon microbead, and the silicon-containing material is silicon oxide.

Preferably, a median particle size of the kernel particle is in a range of substantially from 1.0 μm to 40.0 μm, and a median particle size of the conductive carbon microparticle is in a range of substantially from 10 nm to 5000 nm.

Preferably, a thickness of the connection carbon layer is in a range of substantially from 100 nm to 5000 nm.

Preferably, the conductive carbon microparticle is selected from a group consisting of SuperP, acetylene black, carbon nanotube, flake graphite, soft carbon, hard carbon and combinations thereof.

The present application further relates to a method for preparing the negative electrode material for the secondary battery, including at least steps of:

(1) mixing the kernel particle and a precursor of the connection carbon layer, so as to form a first modified material;

(2) mixing the conductive carbon microparticle or a precursor of the conductive carbon microparticle and the first modified material; and (3) carbonizing a product obtained from step (2) to obtain the negative electrode material for a secondary battery.

Preferably, in step (1), the precursor of the connection carbon layer is selected from a group consisting of polyvinyl chloride, polyvinyl butyral, asphalt, furfural resin, epoxy resin, phenolic resin and combinations thereof.

Preferably, in step (1), a mass ratio of the kernel particle with respect to the precursor of the connection carbon layer is in a range substantially from 5:1 to 40:1.

Preferably, in step (1), the kernel particle and the precursor of the connection carbon layer are mixed at a room temperature or under a heating condition of substantially from 400° C. to 500° C. for substantially from 3 h to 5 h, and the mixing is performed by stirring at a rotation speed of substantially from 10 r/min to 2000 r/min.

Preferably, in step (2), a weight ratio of the conductive carbon microparticle or the precursor of the conductive carbon microparticle with respect to the first modified material is in a range of substantially from 0.5:100 to 5:100;

Preferably, in step (2), the precursor of the conductive carbon microparticle is selected from a group consisting of polyvinyl chloride, polyvinyl butyral, sucrose, glucose, maltose, citric acid, asphalt, furfural resin, epoxy resin, phenolic resin and combinations thereof, the precursor of the conductive carbon microparticle is carbonized into soft carbon or hard carbon;

Preferably, in step (2), the mixing is performed at a room temperature or under a heating condition of substantially from 300° C. to 400° C. for substantially from 0.5 h to 3 h, and the mixing is performed by stirring at a rotation speed of substantially from 10 r/min to 600 r/min.

Preferably, in step (3), the carbonizing includes: rising a temperature of the product obtained from step (2) to be in a range of substantially from 950° C. to 1150° C. at a heating rate in a range of substantially from 0.3° C./min to 0.8° C./min and the temperature is kept for substantially from 8 h to 10 h.

The present application further relates to a secondary battery. The secondary battery includes a positive electrode plate, a negative electrode plate, a separator and an electrolyte. The negative electrode plate includes the negative electrode material for a secondary battery of the present application.

The technical solutions of the present application have at least advantages as follows:

A high-molecular polymer is used as a binder in the present application. A layer of the conductive carbon microparticle is uniformly coated on a surface of a negative electrode active material, so that a stable and effective conductive network is formed in the electrode plate, thereby significantly improving the dynamic performance of the negative electrode material and equipping a battery containing the negative electrode material with acceptable rate performance and fast charging capability.

In a process of preparing the electrode plate using the negative electrode material for the secondary battery of the present application, no additional conductive carbon materials and dry-mixing processes are needed, which reduces the manufacturing cost of the battery.

The method of the present application is simple, easy to control, and easy to achieve large-scale production with a low cost.

1—kernel particle
2—connection carbon layer
3—conductive carbon microparticle

DESCRIPTION OF EMBODIMENTS

In order to facilitate better understanding of the technical solutions of the present invention, a detailed description of the embodiments of the present application will be provided. It should be understood that, these embodiments are merely used to illustrate the present application, rather than limit the present application.

Figure 1:
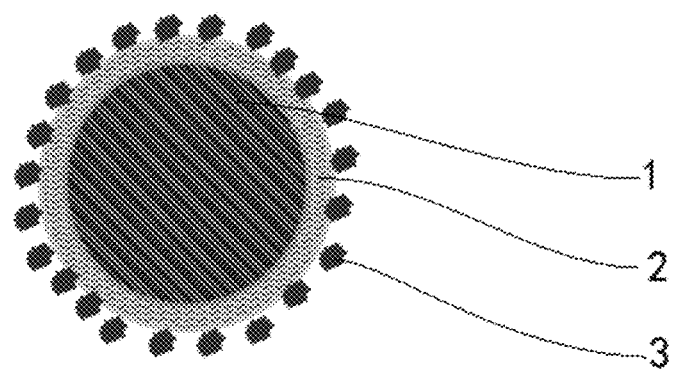
FIG. 1 is a structural schematic diagram of a negative electrode material for a secondary battery according to an embodiment of the present application.
Figure 2:
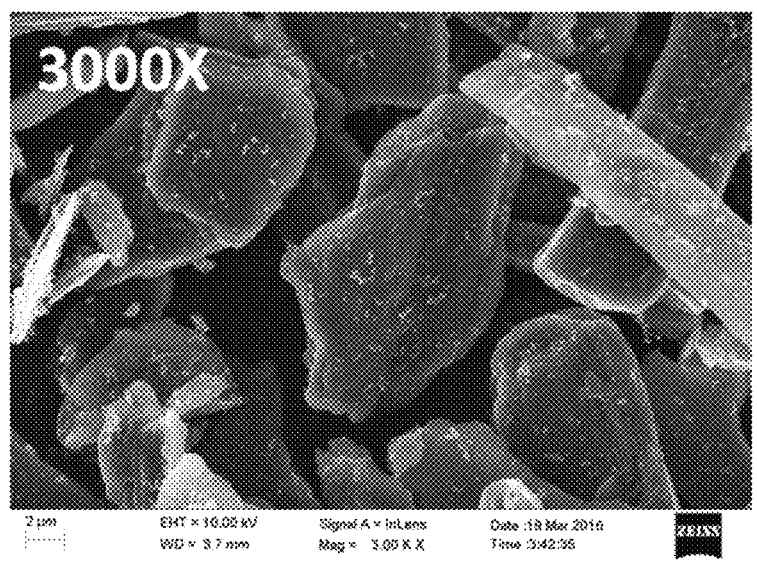
FIG. 2 is an SEM image (magnified 3000 times) of a negative electrode material for a secondary battery according to an embodiment of the present application.
Figure 3:
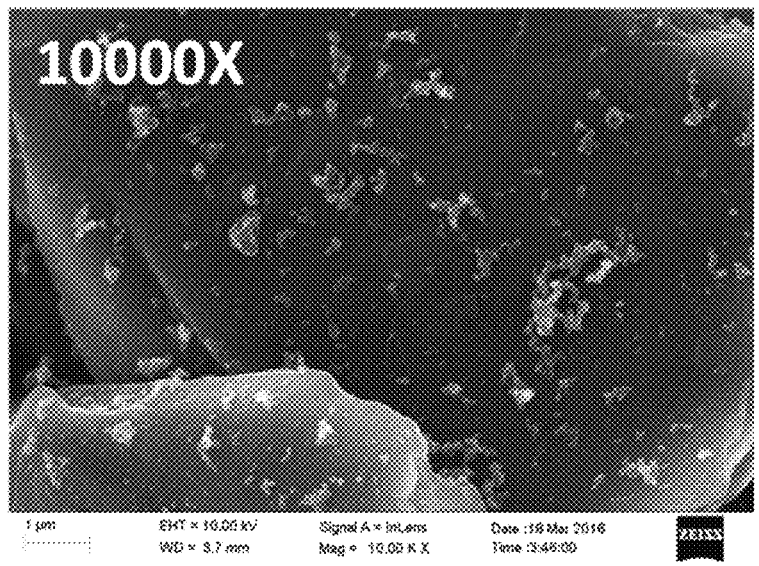
FIG. 3 is another SEM image (magnified 10000 times) of a negative electrode material for a secondary battery according to an embodiment of the present application.
Figure 4:
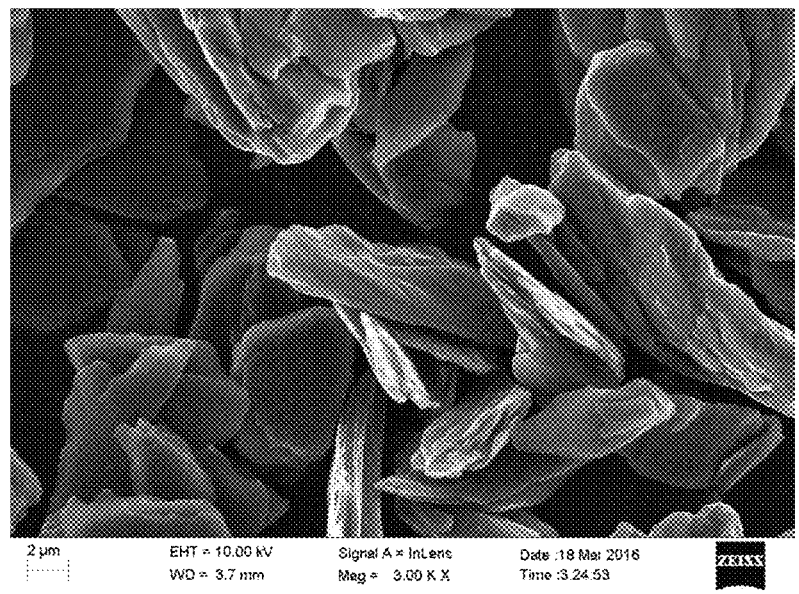
FIG. 4 is an SEM image (magnified 3000 times) of kernel particles of a negative electrode material for a secondary battery according to an embodiment of the present application.

The present application relates to a negative electrode material for a second battery. As shown in FIG. 1, the negative electrode material includes a kernel particle 1, a connection carbon layer 2, and a conductive carbon microparticle 3. The connection carbon layer 2 is coated on a surface of the kernel particle 1. The conductive carbon microparticle 3 is distributed on a surface of the connection carbon layer 2. The connection carbon layer 2 and the conductive carbon microparticle 3 are made of carbon. A layer of the conductive carbon microparticle 3 and the connection carbon layer 2 are coated on the surface of the kernel particle 1, so that a stable and effective conductive network can be formed in an electrode plate, thereby significantly improving the dynamic performance of the negative electrode material and imparting a cell containing the negative electrode material with fast charging capability. A structure of the negative electrode material is shown as FIG. 1. The negative material of the present application is also investigated by SEM (Scanning Electron Microscopy), and SEM images are shown in FIGS. 2 and 3. An SEM image of the kernel particle 1 before being coated is shown in FIG. 4. It can be found that, the conductive carbon microparticles 3 are uniformly distributed on the surface of the connection carbon layer 2, and cover about 0.1%-20% of the surface area of the kernel particle, so that the conductive carbon microparticles 3 can be used as contact points of the surface of the negative electrode material to form the conductive network.

As an improvement of the negative electrode material for the secondary battery of the present application, a median particle size of the negative electrode material is in a range of from about 1.5 μm to about 60.0 μm. If the median particle size of the negative electrode material is too small, a specific surface area of the negative electrode material will be too large, and the cell prepared by using the negative electrode material will have a short calendar life. If the median particle size of the negative electrode material is too big, it will be difficult to uniformly coat the negative electrode material during preparation of an active material layer.

As an improvement of the negative electrode material for the secondary battery of the present application, the kernel particle 1 is made of a carbon-containing material or a silicon-containing material. In other embodiments, the material of the kernel particle 1 can be other material stable at a high temperature, and is not limited to be the carbon-containing material or the silicon-containing material.

As an improvement of the negative electrode material for the secondary battery of the present application, the carbon-containing material is selected from a group consisting of graphite, soft carbon, hard carbon and mesocarbon microbead, and the silicon-containing material can be silicon dioxide. In other embodiments, the carbon-containing material or the silicon-containing material are not limited to the above-mentioned materials.

As an improvement of the negative electrode material for the secondary battery of the present application, when the carbon-containing material is graphite, a purity of the graphite is ≥98%, and preferably, the graphite is preferably graphite particles that are spherical or nearly spherical, such as ungraphitized spherical natural graphite or spherical artificial graphite.

As an improvement of the negative electrode material for the secondary battery of the present application, a median particle size of the kernel particle 1 is in a range of from about 1.0 μm to about 40.0 μm, and a median particle size of the conductive carbon microparticle is in a range of from about 10 nm to about 5000 nm.

As an improvement of the negative electrode material for the secondary battery of the present application, a thickness of the connection carbon layer 2 is in a range of from about 50 nm to about 5000 nm. The chemical stability of the connection carbon layer 2 will be worsened if the connection carbon layer 2 is too thick, and thus the cycle life and the calendar life of the cell will be negatively influenced. However, if the connection carbon layer 2 is too thin, the connection carbon layer 2 cannot exert an adhesive bonding function, and the conductive carbon microparticles 3 will easily fall off.

As an improvement of the negative electrode material for the secondary battery of the present application, the conductive carbon microparticles 3 are selected from a group consisting of SuperP, acetylene black, carbon nanotube, flake graphite, soft carbon, hard carbon and combinations thereof. The soft carbon or the hard carbon is prepared by carbonizing a precursor of the conductive carbon microparticle. For example, asphalt is carbonized to form soft carbon, and polyvinyl chloride is carbonized to form hard carbon.

The present application further relates to a method for preparing the negative electrode material for the secondary battery. The method for preparing the negative electrode material for the secondary battery at least includes steps of:

(1) mixing the kernel particle and a precursor of the connection carbon layer, thereby forming a first modified material coated with the precursor of the connection carbon layer;

(2) mixing the conductive carbon microparticle or a precursor of the conductive carbon microparticle and the first modified material, so as to disperse the conductive carbon microparticle or the precursor of the conductive carbon microparticle on a surface of the first modified material; and (3) carbonizing a product obtained in step (2) to obtain the negative electrode material for the secondary battery.

In the present application, by mixing twice and carbonizing once, i.e., first, the precursor of the connection carbon layer coated on the surface of the kernel particle is carbonized to form the connection carbon layer 2 having the connection function, and then, the precursor of the conductive carbon microparticle 3 dispersed on the connection carbon layer 2 is carbonized to form the conductive carbon microparticle 3. During the carbonization process, a C—C bond is formed between the connection carbon layer 2 and the conductive carbon microparticle 3, which results in a firm connection between the connection carbon layer 2 and the conductive carbon microparticle 3. Additionally, by Raman spectroscopy, it is found that, a surface of the kernel particle 2 before being coated is in a graphite structure with high degree of crystallinity, relatively few defects, and relatively small ID:IG ratio; and the surface of the first modified material obtained after the coating is in a soft carbon structure or in a hard carbon structure with low degree of crystallinity, relatively more defect, and relatively big ID:IG ratio.

The conductive carbon microparticles 3 formed on the surface of the negative electrode material by carbonization will not be displaced after repeated cycling of the secondary battery, and thus can form a stable conductive network.

As an improvement of the method for preparing the negative electrode material for the secondary battery of the present application, in step (1), the precursor of the connection carbon layer 1 is selected from a group consisting of polyvinyl chloride, polyvinyl butyral, asphalt, furfural resin, epoxy resin, phenolic resin and combinations thereof. The precursor of the connection carbon layer 1 is not limited to the above-mentioned materials, and a material can be used as long as it can be easily carbonized and has certain adhesive property after being heated.

As an improvement of the method for preparing the negative electrode material for the secondary battery of the present application, in step (1), a mass ratio of the kernel particle 1 with respect to the precursor of the connection carbon layer 2 is in a range from about 5:1 to about 40:1. At the mass ratio, the connection carbon layer 2 is formed with an appropriate thickness. If the connection carbon layer 2 is too thin, the connection between the kernel particle 1 and the conductive carbon microparticle 3 is unstable. Since the degree of crystallinity of the connection carbon layer 2 is relatively low, a lithium intercalation capacity is low, and the chemical stability is poor, the battery capacity and the battery performance will be negatively influenced if the connection carbon layer 2 is too thick.

As an improvement of the method for preparing the negative electrode material for the secondary battery of the present application, in step (1), the kernel particle 1 and a precursor of the connection carbon layer 2 are mixed at a room temperature or under a heating condition. If under a heating condition, a heating temperature is in a range of from about 400° C. to about 500° C. Under the heating condition, the precursor of the connection carbon layer 2 can soften, so that the precursor of the connection carbon layer 2 can be more uniformly coated on the surface of the kernel particle 1. At the room temperature, a coating layer can also formed due to effect of mechanical force. A time of mixing is in a range of from 3 h to 5 h. The mixing is performed by stirring at a rotation speed in a range of from about 10 r/min to about 2000 r/min.

As an improvement of the method for preparing the negative electrode material for the secondary battery of the present application, in step (2), a weight ratio of the conductive carbon microparticle 3 or the precursor of the conductive carbon microparticle 3 with respect to the first modified material is in a range of from about 0.5:100 to about 5:100.

As an improvement of the method for preparing the negative electrode material for the secondary battery of the present application, in step (2), the precursor of the conductive carbon microparticle 3 is selected from a group consisting of polyvinyl chloride, polyvinyl butyral, sucrose, glucose, maltose, citric acid, asphalt, furfural resin, epoxy resin, phenolic resin and combinations thereof. The precursor of the conductive carbon microparticle 3 is carbonized to form soft carbon or hard carbon.

As an improvement of the method for preparing the negative electrode material for the secondary battery of the present application, in step (2), the mixing is performed at a room temperature or under a heating condition. If under a heating condition, a heated temperature is in a range of from about 300° C. to about 400° C. A time of mixing is in a range of from about 0.5 h to about 3 h. A mixing is performed by stirring at a ration speed of from about 10 r/min to about 600 r/min.

As an improvement of the method for preparing the negative electrode material for the secondary battery of the present application, in step (3), a condition of carbonization includes: the temperature is raised to be in a range of from about 950° C. to about 1150° C. at a heating rate of 0.5° C./min, and the temperature of from about 950° C. to about 1150° C. is kept for from about 8 h to about 10 h.

The present application further relates to a secondary battery. The secondary battery includes a positive electrode plate, a negative electrode plate, a separator and an electrolyte. The negative electrode plate includes the negative electrode material of the present application.

Embodiments

A negative electrode material for a secondary battery includes a kernel particle 1, a connection carbon layer 2, and a conductive carbon microparticle 3. The connection carbon layer 2 is coated on a surface of the kernel particle 1. The conductive carbon microparticle 3 are distributed on a surface of the connection carbon layer 2.

The method for preparing the negative electrode material includes:

1, mixing the kernel particle 1 and a precursor of the connection carbon layer 2 at a high speed to form a first modified material coated with the precursor of the connection carbon layer 2. A time of the mixing is in a range of from about 3 h to about 5 h. The mixing is performed by stirring at a rotation speed in a range of from about 900 r/min to about 1500 r/min. A weight ratio of the kernel particle 1 with respect to the precursor of the connection carbon layer is recorded as A. Materials of the kernel particle 1 and the precursor of the connection carbon layer 2 are listed in Table 1, and conditions of mixing is illustrated in Table 2.

2, mixing the conductive carbon microparticle 3 or the precursor of the conductive carbon microparticle 3 and the first modified material by stirring at a high speed so as to disperse the conductive carbon microparticle 3 or the precursor of the conductive carbon microparticle 3 on a surface of the first modified material. A time of the mixing is in a range of from about 0.5 h to about 3 h. A rotation speed of the stirring is in a range of from about 300 r/min to about 600 r/min. A weight ratio of the conductive carbon microparticle 3 or the precursor of the conductive carbon microparticle 3 with respect to the first modified material is recorded as B. Materials of the conductive carbon microparticle 3, the precursor of the conductive carbon microparticle 3 and the first modified material are listed in Table 1 and conditions of the mixing are illustrated in Table 2.

3, carbonizing a product obtained in step 2 in a roller kiln with nitrogen atmosphere, then cooling thus carbonized product to a room temperature, pulverizing, screening, and demagnetizing to obtain the negative electrode material with a median particle size in a range of from about 1.5 μm to about 60.0 μm. Conditions of the carbonizing are illustrated in Table 2.

TABLE 1

| No. | Kernel particle Material | D50 (μm) | Precursor of connection carbon layer Material | D50 (μm) | A | Conductive carbon microparticle or precursor thereof Material | D50 (μm) | B |
|---|---|---|---|---|---|---|---|---|
| 1 | graphitized mesocarbon microbead | 16 | asphalt | 5 | 10:1 | acetylene black | 0.05 | 1:100 |
| 2 | ungraphitized spherical natural graphite | 18 | asphalt | 3 | 20:1 | sucrose | 2 | 1:120 |
| 3 | ungraphitized spherical natural graphite | 14 | asphalt | 2 | 6:1 | phenolic resin | 3 | 1:70 |
| 4 | spherical artificial graphite | 16 | asphalt | 6 | 33:1 | conductive carbon LTX 200 | 0.5 | 1:200 |
| 5 | soft carbon | 6 | asphalt | 5 | 5:1 | polyvinyl chloride | 1.5 | 1:20 |
| 6 | soft carbon | 8 | polyvinyl butyral | 5 | 35:1 | polyvinyl butyral | 1.5 | 1:50 |
| 7 | hard carbon | 5 | furfural resin | 1.5 | 40:1 | SuperP | 0.15 | 1:150 |
| 8 | hard carbon | 10 | epoxy resin | 1.5 | 30:1 | glucose | 3 | 1:100 |
| 9 | silicon dioxide | 5 | phenolic resin | 3 | 20:1 | maltose | 1.5 | 1:80 |
| 10 | silicon dioxide | 5 | polyvinyl chloride | 4 | 10:1 | citric acid | 1.5 | 1:40 |
| 11 | graphitized mesocarbon microbead | 14 | polyvinyl butyral | 3 | 15:1 | furfural resin | 2 | 1:100 |
| 12 | ungraphitized spherical natural graphite | 18 | furfural resin | 3 | 25:1 | epoxy resin | 1.5 | 1:150 |
| 13 | ungraphitized spherical natural graphite | 20 | epoxy resin | 2 | 20:1 | flake graphite | 3 | 1:120 |
| 14 | graphitized mesocarbon microbead | 12 | phenolic resin | 3 | 10:1 | asphalt | 3 | 1:90 |

The ungraphitized spherical natural graphite is a product of Shenzhen Bei Te Rui new energy material LTD., the spherical artificial graphite is a product of Jiangxi Zi Chen technology LTD., and the conductive carbon LTX 200 is a product of CABOT.

TABLE 2

| | Step 1 | | Precursor of the connection carbon layer | | Conductive carbon microparticle or precursor thereof | | Time of |
|---|---|---|---|---|---|---|---|
| NO. | Temperature of mixing (° C.) | Time of mixing (h) | Temperature of mixing (° C.) | Time of mixing (h) | Heating rate (° C./min) | Temperature heated to (° C.) | keeping temperature (h) |
| 1 | 400 | 4 | room temperature | 0.5 | 0.5 | 1000 | 10 |
| 2 | 500 | 3 | 350 | 3 | 0.5 | 950 | 10 |

TABLE 2-continued

|  | Step 1 | | Precursor of the connection carbon layer | | Conductive carbon microparticle or precursor thereof | | |
| --- | --- | --- | --- | --- | --- | --- | --- |
| NO. | Temperature of mixing (° C.) | Time of mixing(h) | Temperature of mixing (° C.) | Time of mixing(h) | Heating rate (° C./min) | Temperature heated to (° C.) | Time of keeping temperature (h) |
| 3 | 500 | 5 | room temperature | 1.5 | 0.5 | 1050 | 8 |
| 4 | room temperature | 0.5 | room temperature | 2.5 | 0.5 | 1150 | 9 |
| 5 | 400 | 4 | 320 | 0.5 | 0.6 | 1050 | 9 |
| 6 | 500 | 3 | 350 | 3 | 0.7 | 980 | 10 |
| 7 | 500 | 5 | 300 | 0.5 | 0.4 | 1080 | 8 |
| 8 | 450 | 0.5 | room temperature | 2.5 | 0.6 | 1100 | 10 |
| 9 | 400 | 4 | 400 | 1.5 | 0.7 | 1060 | 9 |
| 10 | 500 | 3 | 350 | 3 | 0.4 | 950 | 10 |
| 11 | 500 | 5 | 380 | 0.5 | 0.6 | 1120 | 8 |
| 12 | room temperature | 0.5 | room temperature | 1.5 | 0.7 | 1100 | 10 |
| 13 | room temperature | 1 | room temperature | 2.5 | 0.3 | 1040 | 9 |
| 14 | room temperature | 1 | room temperature | 0.5 | 0.5 | 980 | 10 |

Comparative Examples

A negative electrode material is prepared by a similar method as the method for preparing the negative electrode material in the above Embodiments. However, some raw materials are different and are listed in Table 3, and some conditions are different and are illustrated in Table 4.

TABLE 3

| | Kernel particle | | Precursor of connection carbon layer | | | Conductive carbon microparticle or precursor thereof | | |
| --- | --- | --- | --- | --- | --- | --- | --- | --- |
| No. | Material | D50 (μm) | Material | D50 (μm) | A | Material | D50 (μm) | B |
| D1 | graphitized mesocarbon microbead | 16 | — | — | — | — | — | — |
| D2 | ungraphitized spherical natural graphite | 18 | — | — | — | — | — | — |
| D3 | spherical artificial graphite | 14 | — | — | — | — | — | — |
| D4 | ungraphitized spherical natural graphite | 14 | asphalt | 2 | 20:1 | — | — | — |
| D5 | ungraphitized spherical natural graphite | 14 | asphalt | 2 | 1:1 | phenolic resin | 3 | 1:70 |
| D6 | ungraphitized spherical natural graphite | 14 | asphalt | 2 | 50:1 | phenolic resin | 3 | 1:70 |
| D7 | ungraphitized spherical natural graphite | 14 | asphalt | 2 | 20:1 | phenolic resin | 3 | 1:10 |
| D8 | ungraphitized spherical natural graphite | 14 | asphalt | 2 | 20:1 | phenolic resin | 3 | 1:300 |
| D9 | ungraphitized spherical natural graphite | 14 | asphalt | 2 | 20:1 | phenolic resin | 3 | 1:70 |

TABLE 4

| No. | Step 1 Temperature of mixing (° C.) | Step 1 Time of mixing (h) | Precursor of the connection carbon layer Temperature of mixing (° C.) | Precursor of the connection carbon layer Time of mixing(h) | Conductive carbon microparticle or precursor thereof Heating rate (° C./min) | Conductive carbon microparticle or precursor thereof temperature heated to (° C.) | Conductive carbon microparticle or precursor thereof Time of keeping temperature (h) |
|---|---|---|---|---|---|---|---|
| D1~D3 | — | — | — | — | — | — | — |
| D4~D8 | 500 | 3 | 350 | 3 | 0.5 | 950 | 10 |
| D9 | 500 | 3 | 350 | 3 | 0.5 | 2000 | 24 |

Experimental Example

Preparation for Batteries:

1. Graphite, a conductive carbon and an adhesive additive are mixed in a mass ratio of the graphite:the conductive carbon:the adhesive additive of substantially 97:1:2 to prepare a mixture for comparative examples D1-D4. The negative electrode materials of Embodiments 1-14 of the present application and comparative examples D5-D9 are respectively mixed with a binder in a mass ratio of the negative electrode material: the binder of substantially 98:2 to prepare mixtures for Embodiments 1-14 and comparative examples D5-D9. Each mixture is controlled at a solid content of substantially 50% and is coated on a copper foil current collector, and then vacuum dried, thereby obtaining negative electrode plates 1-14 of Embodiments 1-14 and negative electrode plates D1-D9 of comparative examples D1-D9.

2. Winding each of the above obtained negative electrode plates 1-14 and D1-D9, a ternary positive electrode plate made by a traditional and mature method, electrolyte of 1 mol/L $LiPF_6$ dissolved in EC+DMC+EMC (volume ratio of 1:1:1) and a separator (Celgard2400), so as to obtain soft-packaged batteries 1-14 and batteries D1-D9.

A Following Method is Used to Test Charging Performance:

A battery testing system from Wuhan JinNuo electronics Co., LTD. is used. A charging/discharging voltage is limited to be from about 2.8V to about 4.2V. According to actually tested nominal capacity C0, each of the above batteries 1-14 and batteries D1-D9 is tested by 10 samples, and then charging at rates of 1.0 C, 1.2 C, 1.4 C, 1.5 C, 1.6 C, 1.7 C, 1.8 C, 1.9 C, 2.0 C and 2.1 C and discharging at a rate of 1.0 C0 to each of the 10 samples is repeated for 20 times. Then, the batteries are disassembled to investigate Li precipitation on the anode.

Maximum charging rate=minimum charging rate when Li precipitation occurs−0.1 C

Experimental results are shown in Table 5

TABLE 5

| NO. | A state of Li precipitation when charging at 1.5 C | Maximum charging rate |
|---|---|---|
| 1 | No Li precipitation occurred | 1.6 C |
| 2 | No Li precipitation occurred | 1.5 C |
| 3 | No Li precipitation occurred | 1.7 C |
| 4 | No Li precipitation occurred | 1.8 C |
| 5 | No Li precipitation occurred | 1.5 C |
| 6 | No Li precipitation occurred | 1.6 C |
| 7 | No Li precipitation occurred | 2.0 C |
| 8 | No Li precipitation occurred | 1.5 C |
| 9 | No Li precipitation occurred | 2.0 C |
| 10 | No Li precipitation occurred | 1.5 C |
| 11 | No Li precipitation occurred | 1.5 C |
| 12 | No Li precipitation occurred | 1.6 C |
| 13 | No Li precipitation occurred | 2.0 C |
| 14 | No Li precipitation occurred | 1.6 C |
| D1 | Li precipitation occurred | 1.0 C |
| D2 | Li precipitation occurred | 1.1 C |
| D3 | Li precipitation occurred | 1.1 C |
| D4 | Li precipitation occurred | 1.0 C |
| D5 | The material has a poor processing performance and thus is difficult to be made into a battery. | |
| D6 | Li precipitation occurred | 1.2 C |
| D7 | Li precipitation occurred | 1.4 C |
| D8 | Li precipitation occurred | 1.2 C |
| D9 | Li precipitation occurred | 0.9 C |

The embodiments described above are merely preferred embodiments of the present application and they do not limit the present invention. Those skilled in the art can make various changes and modifications without departing from the invention concept of the present application. Therefore, the protection scope of the present application shall be defined by the claims.

What is claimed is:

1. A negative electrode material for a secondary battery, comprising a kernel particle, a connection carbon layer, and conductive carbon microparticles, wherein the connection carbon layer is coated on a surface of the kernel particle and the conductive carbon microparticles are distributed on a surface of the connection carbon layer,
wherein a thickness of the connection carbon layer is in a range of substantially from 100 nm to 5000 nm, and
wherein the connection carbon layer and the conductive carbon microparticles are bonded through C—C bonding.

2. The negative electrode material for the secondary battery according to claim 1, wherein a median particle size of the negative electrode material is in a range of substantially from 1.5 μm to 60.0 μm.

3. The negative electrode material for the secondary battery according to claim 1, wherein the kernel particle is made of a carbon-containing material or a silicon-containing material.

4. The negative electrode material for the secondary battery according to claim 3, wherein the carbon-containing material is selected from a group consisting of graphite, soft carbon, hard carbon, and mesocarbon microbead, and the silicon-containing material is silicon oxide.

5. The negative electrode material for the secondary battery according to claim 1, wherein a median particle size of the kernel particle is in a range of substantially from 1.0

μm to 40.0 μm, and a median particle size of the conductive carbon microparticles is in a range of substantially from 10 nm to 5000 nm.

6. A method for preparing the negative electrode material for the secondary battery according to claim 1, comprising at least the steps of:
   (1) mixing the kernel particle and a precursor of the connection carbon layer, so as to form a first modified material;
   (2) mixing the conductive carbon microparticles and the first modified material; and
   (3) carbonizing a product obtained from step (2) to obtain the negative electrode material for the secondary battery.

7. The method for preparing the negative electrode material for the secondary battery according to claim 6, wherein in step (1), the precursor of the connection carbon layer is selected from a group consisting of polyvinyl chloride, polyvinyl butyral, asphalt, furfural resin, epoxy resin, phenolic resin, and combinations thereof.

8. The method for preparing the negative electrode material for the secondary battery according to claim 7, wherein a mass ratio of the kernel particle with respect to the precursor of the connection carbon layer is in a range substantially from 5:1 to 40:1.

9. The method for preparing the negative electrode material for the secondary battery according to claim 7, wherein the kernel particle and the precursor of the connection carbon layer are mixed at a room temperature or under a heating condition of substantially from 400° C. to 500° C. for substantially from 3 h to 5 h, and the mixing is performed by stirring at a rotation speed of substantially from 10 r/min to 2000 r/min.

10. The method for preparing the negative electrode material for the secondary battery according to claim 6, wherein in step (2), a weight ratio of the conductive carbon microparticles with respect to the first modified material is in a range of substantially from 0.5:100 to 5:100.

11. The method for preparing the negative electrode material for the secondary battery according to claim 10, wherein the mixing is performed at a room temperature or under a heating condition of substantially from 300° C. to 400° C. for substantially from 0.5 h to 3 h, and the mixing is performed by stirring at a rotation speed of substantially from 10 r/min to 600 r/min.

12. The method for preparing the negative electrode material for the secondary battery according to claim 6, wherein in step (3), the carbonizing comprises: rising a temperature of the product obtained from step (2) to be in a range of substantially from 950° C. to 1150° C. at a heating rate in a range of substantially from 0.3° C./min to 0.8° C./min and keeping the temperature for substantially from 8 h to 10 h.

13. The secondary battery, comprising a positive electrode plate, a negative electrode plate, a separator, and an electrolyte, wherein the negative electrode plate comprises the negative electrode material for the secondary battery according to claim 1.

14. The negative electrode material for the secondary battery according to claim 1, wherein the conductive carbon microparticles are carbon black.

15. The negative electrode material for the secondary battery according to claim 1, wherein the conductive carbon microparticles are uniformly distributed on the surface of the connection carbon layer and cover about 0.1%-20% of a surface area of the kernel particle.

* * * * *